May 15, 1928. 1,669,435
W. W. WHEELER
APPARATUS FOR TREATING VEGETATION
Filed Nov. 24, 1922 2 Sheets-Sheet 1

WITNESSES
M. W. Fowler.

INVENTOR
William W. Wheeler
BY
ATTORNEYS

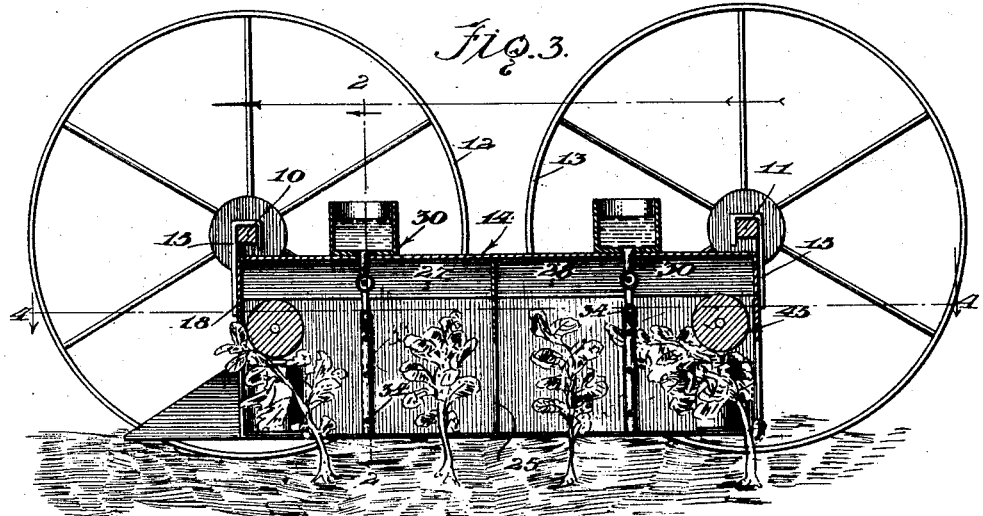

Patented May 15, 1928.

1,669,435

UNITED STATES PATENT OFFICE.

WILLIAM WILLIS WHEELER, OF JACKSONVILLE, FLORIDA.

APPARATUS FOR TREATING VEGETATION.

Application filed November 24, 1922. Serial No. 603,034.

This invention relates to an apparatus for treating vegetation and is especially, though not necessarily, adapted for spraying or fumigating plants or crops for the purpose of destroying insects or vermin and arresting the progress and development of disease or injurious fungus.

The object of the invention is to provide a method of and apparatus of this character which may be economically and advantageously used under varying conditions to effect the desired objects and which is especially efficient and economical when employed to effect the destruction of boll weevil.

Another object is to provide an apparatus which is of simple and durable construction, efficient in operation and easy and comparatively inexpensive to manufacture and operate.

Other objects and advantages of the invention reside in certain novel features of the construction, combination and arragement of parts which will be hereinafter more fully described and particularly pointed out in the appended claims, reference being had to the accompanying drawings forming part of this specification and in which:

Figure 3 is a view in longitudinal vertical section on line 3—3 of Figure 2;

Figure 4 is a view in horizontal section on line 4—4 of Figure 3; and

Figure 5 is a detail perspective view of one of the deflectors.

Figure 1:
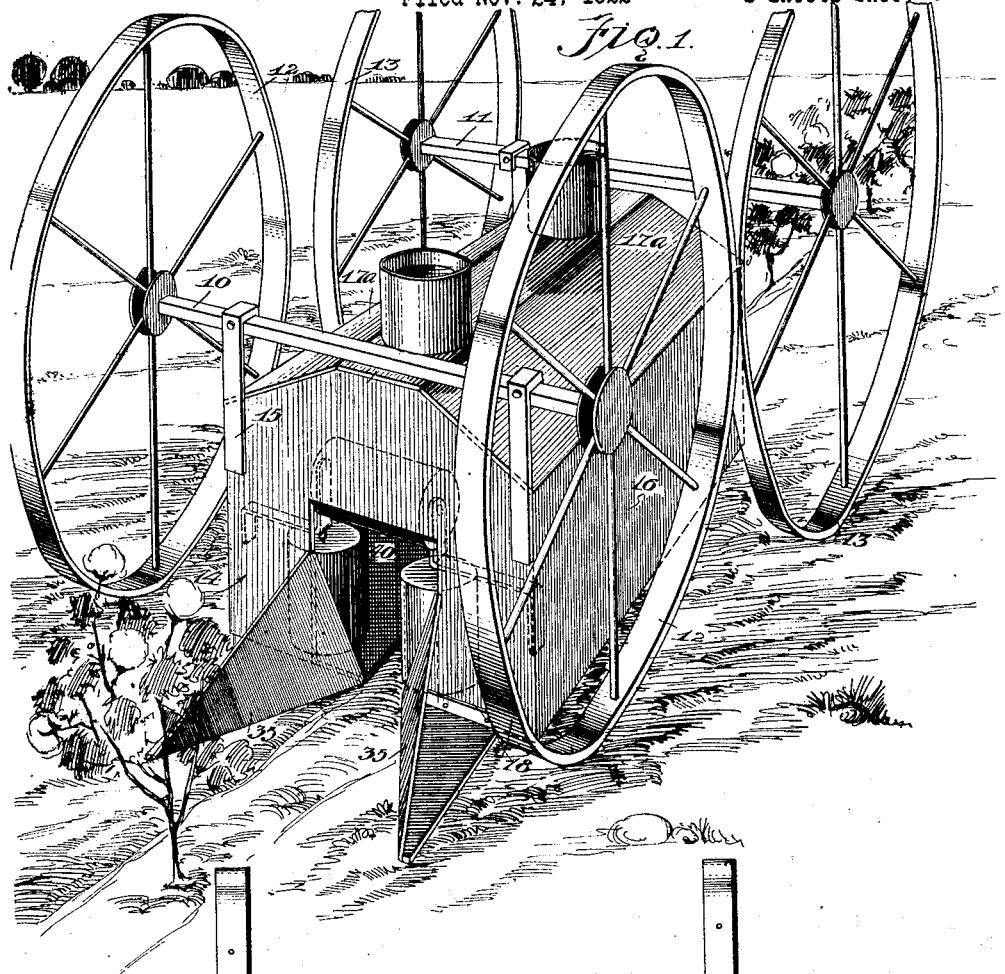
Figure 1 is a perspective view, showing the preferred embodiment of the invention.

Referring to the drawings wherein for the sake of illustration is shown the preferred form of apparatus, the numerals 10 and 11 designate respectively the front and rear axles of the apparatus on which pairs of ground wheels designated at 12 and 13 are rotatably mounted. A substantially closed receptacle 14 which may be constructed of any suitable material such as sheet metal or the like is suspended on the axles by means of hangers 15. The receptacle 14 includes sides 16, a top 17 having hinged sections 17ª, front and rear end walls 18 and 19 and a bottom wall 20. These walls are imperforate except for a passage 22 which is formed in the bottom wall and which has an entrance 23 provided therefor in the front end wall and an exit 24 provided in the rear end wall. A partition 25 is provided within the housing 14 and provides or defines within the housing, chambers 27 and 28 arranged in series. These chambers 27 and 28 are substantially enclosed in view of the nature of the housing with which the partition 25 coacts to define them. The partition 25 which defines the chambers is made in two sections 25ª and 25ᵇ so as not to interrupt the passage 22 which extends from end to end of the housing and through the chambers thereof.

Spraying means is provided for each chamber and is designated generally at 30. As shown in the drawings the spraying means are entirely independent so that the character and quality of the spray in each chamber may be varied as desired. As the spraying means employed are preferably of identical construction, a common description will serve for the spraying means in all of the chambers. The spraying means 30 includes a tank or reservoir 31 suitably supported and secured to the top 17 of the housing and communicating by a valve controlled outlet pipe 32 with a curved distributing pipe 33 taking the form of a yoke and arranged transversely of the chamber so as to extend around the passage 22. The distributing pipe 33 is provided with a plurality of nozzles 34 which are directed so as to project the spray on the plants.

Figure 2:
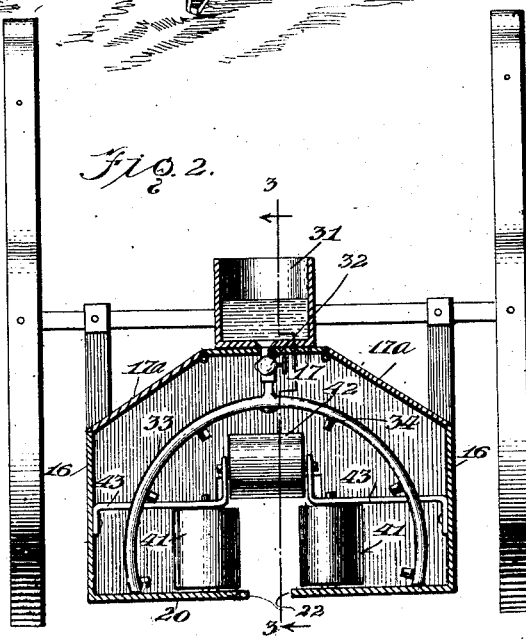
Figure 2 is a view in transverse vertical section on line 2—2 of Figure 3.

Adjacent the entrance 23 to the passage 22 a pair of deflectors 35 are arranged and are supported as at 36 upon the front 18 of the housing 14. These deflectors 35 are constructed as shown in Figure 5 of the drawings and when assembled with the housing they flare outwardly therefrom and consequently converge toward the entrance 23 of the passage 22. The deflectors serve to direct the plants or vegetation to the passage and their function in this respect is supplemented by the action of a series of rollers 40 also arranged adjacent the entrance 23 of the passage but within the housing 14. As clearly shown in Figure 2 of the drawings the series of rollers 40 includes two vertical rollers 41 and a horizontal roller 42 arranged above the vertical rollers 41, the rollers 41 and 42 being rotatably journaled on the bottom 20 and angle brackets 43 supported on the side walls of the housing. A similar set of rollers similarly supported and designated at 45 is arranged at the exit of the passage 22.

In use the wheeled housing is advanced along a row of plants so that the plants will successively pass through chambers 27 and 28. The plants are accommodated in the passage 22 during the time in which they are within the chambers 27 and 28 and the action of the deflectors 35 and rollers 40 insures the disposition of the plants in this passage 22. The deflectors 35 converge toward the entrance to the passage so as to deflect the plants to this entrance. The vertical rollers 41 act on the foliage of the plants to compact the same during the passage of the plants through the entrance and the horizontal roller 42 bends over the top of the plants whereby the foliage and top of the plants are preserved from injury. Within the chambers 27 and 28 the foliage expands and the top assumes its normal position so as to be best positioned for efficient spraying. It is to be noted that the chambers 27 and 28 being enclosed may be highly charged or laden with the substance with which the plants are to be treated and since these plants are successively treated in the chambers 27 and 28 the most efficient and thorough spraying or treating of the plants may be obtained. On leaving the housing the plants are again subjected to the action of a series of rollers similar to the series 40 so as to compact the foliage and bend the top of the plant to insure its leaving the passage 22 without injury.

In view of the independent spraying means employed with each chamber it is obvious that combination treatments may be employed if desired that is to say plants may be subjected to one treatment in the chamber 27 and to a diverse treatment in the chamber 28 in lieu of successive treatments of the same kind.

Since the spraying means are entirely independent, the character and quality of the spray may be varied within reasonably wide limits. The provision of two or more sprays will permit of plant treatment with different substances, such, for example, as a growth stimulant and an insecticide; or the same substance could be used in both sprays where the plant growth is extremely thick and bushy, and a copious application is desirable. As I have stated previously herein, the character and quality of the spray used may be varied and I do not desire to be limited to similar or different specific types of plant treatment mediums.

I claim:

1. In an apparatus of the character described, a wheeled housing having a plurality of chambers therein, said housing being substantially closed and having a passage extending from end to end thereof and through the chambers, spraying means arranged in each chamber, and rollers carried by the housing and operating at the entrance to and at the exit from the passage.

2. In an apparatus of the character described, front and rear axles, ground wheels rotatably mounted on said axles, a substantially closed housing having a passage extending from end to end thereof, hangers for suspending from the axle, a partition within the housing defining enclosed chambers through which the passage also extends, the chambers being arranged in series, spraying means for each chamber, deflectors carried by the housing and located at the entrance to the passage, and a series of rollers arranged within the housing and also at the entrance to the passage.

3. In an apparatus for treating plants, a wheeled housing having a treatment chamber therein and having a passage extending through the chamber and a series of rollers arranged at the entrance to the passage and including vertical rollers for compacting the foliage and a horizontal roller for bending the top of the plant during the passage of the plant into the chamber.

WILLIAM WILLIS WHEELER.